US006154545A

United States Patent [19]

Kohut et al.

[11] Patent Number: 6,154,545

[45] Date of Patent: Nov. 28, 2000

[54] METHOD AND APPARATUS FOR TWO CHANNELS OF SOUND HAVING DIRECTIONAL CUES

[75] Inventors: Michael Kohut, Oiai; James Mercs; Laura Mercs, both of Huntington Beach; Paul M. Embree, Irvine; Paul Nigel Wood, Glendale, all of Calif.

[73] Assignees: Sony Corporation, Tokyo, Japan; Sony Pictures Entertainment, Inc., Culver City, Calif.

[21] Appl. No.: 09/133,289

[22] Filed: Aug. 12, 1998

Related U.S. Application Data

[62] Division of application No. 08/895,173, Jul. 16, 1997.

[51] Int. Cl.[7] ................................ H04K 1/00; H04L 9/00

[52] U.S. Cl. ................................................ 381/23; 381/20

[58] Field of Search ................................ 381/17, 18, 19, 381/20, 21, 22, 23, 61, 63, 1

[56] References Cited

U.S. PATENT DOCUMENTS 2,846,504 8/1958 Mikulyak .
3,088,997 5/1963 Bauer .
3,863,028 1/1975 Fixler .
3,970,787 7/1976 Searle .
4,088,849 5/1978 Usami et al. .
4,119,798 10/1978 Iwahara .
4,209,665 6/1980 Iwahara .
4,218,585 8/1980 Carver .
4,251,688 2/1981 Furner .
4,308,424 12/1981 Bice .
4,589,128 5/1986 Pfeiderer .
5,033,086 7/1991 Fidi .
5,181,248 1/1993 Inanaga et al. .
5,371,799 12/1994 Lowe et al. .
5,386,082 1/1995 Higashi .
5,438,623 8/1995 Begault .
5,459,790 10/1995 Scofield et al. .
5,579,396 11/1996 Iida et al. .
5,598,478 1/1997 Tanaka et al. .
5,661,812 8/1997 Scofield et al. .
5,742,689 4/1998 Tucker et al. .

FOREIGN PATENT DOCUMENTS 0684751 5/1994 European Pat. Off. .
0637191 7/1994 European Pat. Off. .
2344259 4/1975 Germany .
1600885 10/1981 United Kingdom .
2224186A 4/1990 United Kingdom .
9531881 11/1995 WIPO .

OTHER PUBLICATIONS

International Search Report, PCT/US98/01048, Oct. 9, 1998.

AudioReality Handout by Crystal River Engineering, p. 1, No Date.

*Primary Examiner*—Ping Lee
*Attorney, Agent, or Firm*—Blakely, Sokoloff, Taylor & Zafman LLP

[57] ABSTRACT

The system and method of the present invention provides enhanced surround sound effects. In one embodiment, 90° phase shift and copy of the modified head related transfer functions (HRTF) are applied to each rear sound signal. The modified HRTF for each rear signal is generated by removing the head related transfer function corresponding to the front center signal from the HRTF corresponding to the rear sound signal. This provides the audible effect of distinguishing more clearly sounds originating in front of the listener or to the rear of the listener while not limiting the perceived bandwidth of the signal. The rear signals corresponding to the first channel are inverted. The front and rear signals for each corresponding channel are then combined. The two channels, generated can be stored on media, such as film, and subsequently read and input to a surround sound decoder to generate enhanced surround sound output.

10 Claims, 7 Drawing Sheets

METHOD AND APPARATUS FOR TWO CHANNELS OF SOUND HAVING DIRECTIONAL CUES

This application is a Division of Ser. No. 08/895,173 filed Jul. 16, 1997.

FIELD OF THE INVENTION

The present invention relates to a method and apparatus for processing sound, and more specifically, to a method and apparatus for providing enhanced surround sound effects.

BACKGROUND OF THE INVENTION

The quality and realism of the sound produced by the sound systems in movie theaters continues to improve. The realism is produced by using a technique commonly referred to as surround sound wherein multiple sound tracks are recorded and the sound from each of the tracks are played back in speakers that are located in different directions relative to the audience. Currently, many feature films are recorded using seven sound tracks. The seven sound tracks typically include a left surround sound track and a right surround sound track. The left surround sound track is played back through one or more speakers that are behind and to the left of the audience. The right surround sound track is played back through one or more speakers that are behind and to the right of the audience. The remaining five tracks are played back through speakers that are at various angles in front of the audience. Some films have an eighth track that is played back through a subwoofer.

SUMMARY OF THE INVENTION

The system and method of the present invention provides enhanced surround effects. In addition, storage on the media, such as film, is simplified as only two channels are stored on the film. The encoded sound data, once played back through a surround sound decoder, provides enhanced surround sound effects through a multiple speaker arrangement.

The system receives multiple channels of audio. Each channel input is identified as corresponding to a position relative to a listener. The input includes channels providing front signals and channels providing rear signals. Each signal is processed to provide input to the two (e.g., right and left) output channels.

The left surround signal and right surround signal are each shifted 90°. Head related transfer functions (HRTF) are applied to each of the shifted signals. Additional spatial cues may then supplied to the rear sound signals. Some spatial queues, which include level adjustments and time delays, function to move the sounds to the right and left of the user and vary according to whether the sound signal is to be output to the right channel or the left channel. In an alternate embodiment, spatial cues are provided on the rear sound signals by selectively inverting the phase of one of the rear sound signals. Furthermore, in another embodiment a 90° phase shift is applied to the rear signals to provide compatibility with some popular surround sound decoders.

Once spatial cues have been provided, the signals to be output to the right channel are combined. Similarly the signals to be output to the left channel are combined. The copies of the rear signals to be combined into one of the channels are subtracted from the remaining signals to be combined into that channel. Preferably this is accomplished by inverting the rear signals corresponding to the selected channel prior to combining the signals. The resultant combined signals are then recorded on two audio tracks on a recording media, such as film, direct video disk (DVD), video, CD-ROM or computer memory. The two tracks can then be read by presently available surround sound decoders to product the multiple channel output to drive the multiple speakers of a surround sound speaker arrangement. As the encoding process enhances the surround sound signals and further places some of the surround signals onto the front signals, a listener experiences enhanced surround sound effects.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
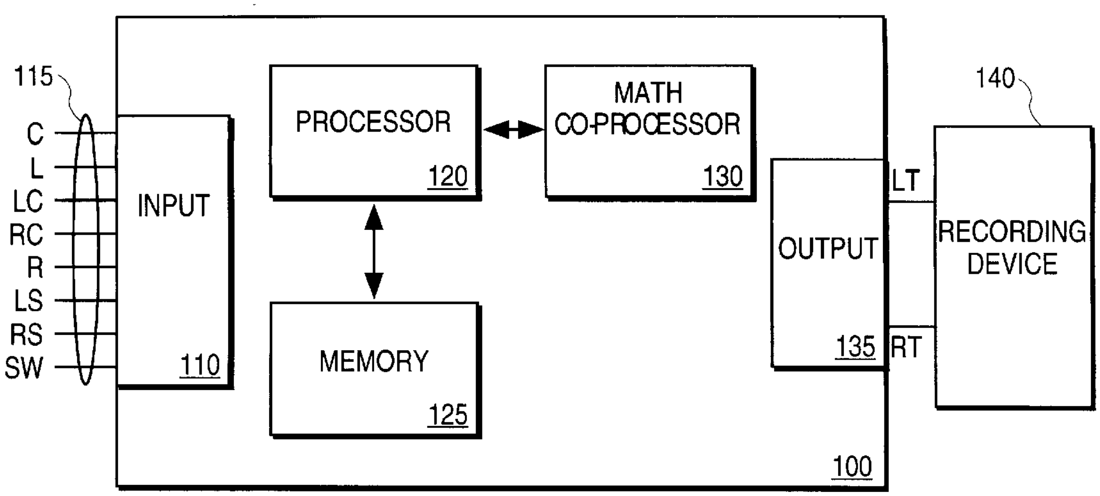
FIG. 1*a* is a block diagram representation of one embodiment of the system of the present invention.

The sound waves detected by human ears have different characteristics based on the position of the source of the sound waves relative to the listener. For example, the sound waves generated by a sound source that is located to the front left of a listener will be detected by the left ear before they will be detected by the right ear. In contrast, the sound waves generated by a sound source which is to the front right of a listener will be detected by the left ear after they are detected by the right ear. These timing differences, as well as volume and frequency response differences, provide cues through which the human brain determines the direction from which a sound is produced relative to the listener. Such cues are referred to hereafter as sound direction cues.

In modern movie theaters, listeners perceive that sounds originate from various positions relative to the themselves because the sounds are in fact being reproduced by speakers located at those various positions. A surround sound system is typically configured with seven speakers plus subwoofers. Six of the speakers are located in front of the listener, left, left center, center, right center, right and subwoofer. Two surround sound speakers, left surround and right surround, are located to the rear of the listener. Thus, the audio channels to be output through the different speakers are generated to provide audible directional cues to the listener. For example, a sound that is intended to be heard from the left is played in a speaker located to the left of the listener. Similarly, a sound that is intended to be heard from the back right is played in a speaker located to the back right of the listener.

Feature films typically have numerous sound tracks. Each sound track is intended to be played from a different position relative to an audience. Thus, speakers to the left of an audience may playback one sound track while speakers directly in front of the audience playback another sound track and speakers to the right of the audience play yet another sound track. In sophisticated theaters, eight sound tracks are played back from eight different positions relative to the audience.

The system and method of the present invention translates sound signals from multiple sound tracks onto two channels in such a way that when subsequently processed by a surround sound decoder for output through the multiple position speaker system, the surround sound effects are enhanced to produce more audibly appealing sound. In an alternate embodiment, the same two channels of sound produced by the system and method of the present invention can be played through head phones or a dual speaker system. In such an embodiment, the playback of the two channels through speakers result in similar audible directional cues that would be produced by a multiple channel state of the art movie theater sound system. Consequently, the sounds generated are perceived as if the sounds are originating from speakers that surround the listener.

One embodiment of the system is described with reference to FIG. 1*a*. Frequently sounds are processed digitally. Therefore, in one embodiment, the system 100 is configured with input circuitry 110 to receive the surround sound signals 115. A processor 120 performs the functions described below to translate the surround sound signals to two channels of sound while maintaining the directional cues to enable the listener to distinguish the locations of origins of sounds. In some embodiments a math coprocessor 130 may be used to perform computations involved with the translation process. Memory 125 is included for storage of signal representations as well as the code executed by the processor to perform the functions described below.

Output circuitry 135 outputs the two channels. The two channels of sound can then be recorded on sound medium, e.g., film, videotapes, digital video disks (DVD), compact disks (CD), audio tapes, etc. by recorder 140. The sound medium can subsequently be read using commercially available equipment and played through a surround sound decoder system or through commercially available home stereo, personal stereo equipment, or computer equipment. Alternately, the output circuitry may include a surround sound decoder or a driver for driving speakers or stereo headphones. It is readily apparent that other configurations, from general purpose computer systems executing software configured to perform the below described processes, to specially configured digital signal processors, and analog or digital circuitry, can be used.

Figure 1B:
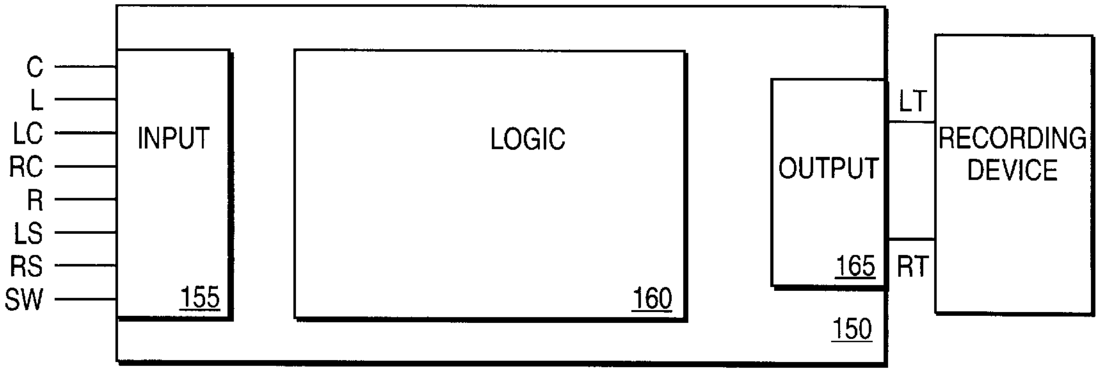
FIG. 1*b* is a block diagram representation of another embodiment of the system of the present invention.

FIG. 1*b* is a simplified block diagram of an alternate embodiment of a system 150 which receives the multiple channel input through input circuitry 155. Logic 160 performs the translation functions to generate two channels of sound which are output through output circuitry 165.

Figure 1C:
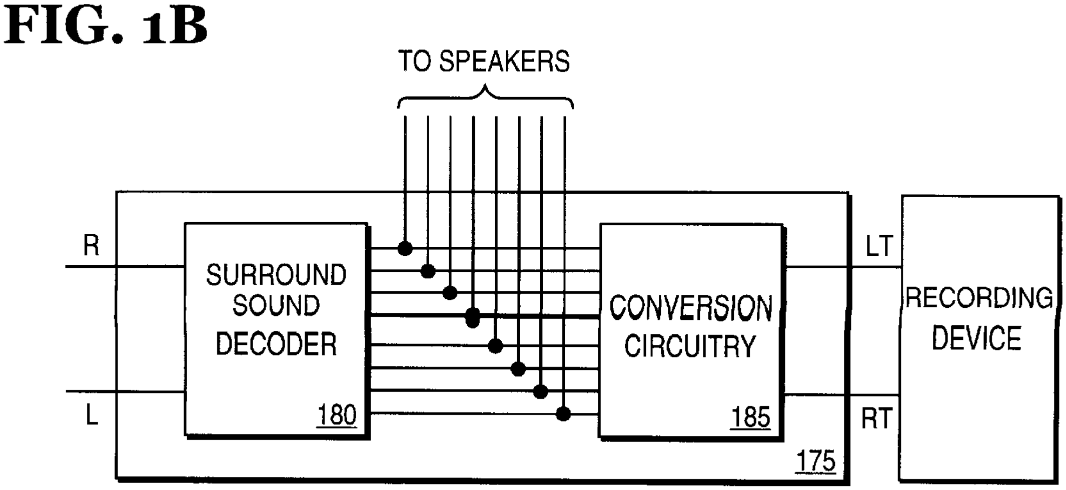
FIG. 1*c* is a block diagram representation of another embodiment of the system of the present invention.

The system of the present invention can be embodied in a variety of systems providing a variety of functions. For example, as shown in FIG. 1*c*, an existing surround sound decoder system 175 can be configured such that the decoder 180 generates multiple (e.g. eight) surround sound outputs for output to surround sound speakers (not shown) or for input to conversion circuitry 185 that translates the multiple channel surround sound input to two channels (LT,RT). Such a system can concurrently output both sets of channels or further include a switching mechanism (not shown) to selectively choose multiple channel surround sound output or two channel output.

Figure 1D:
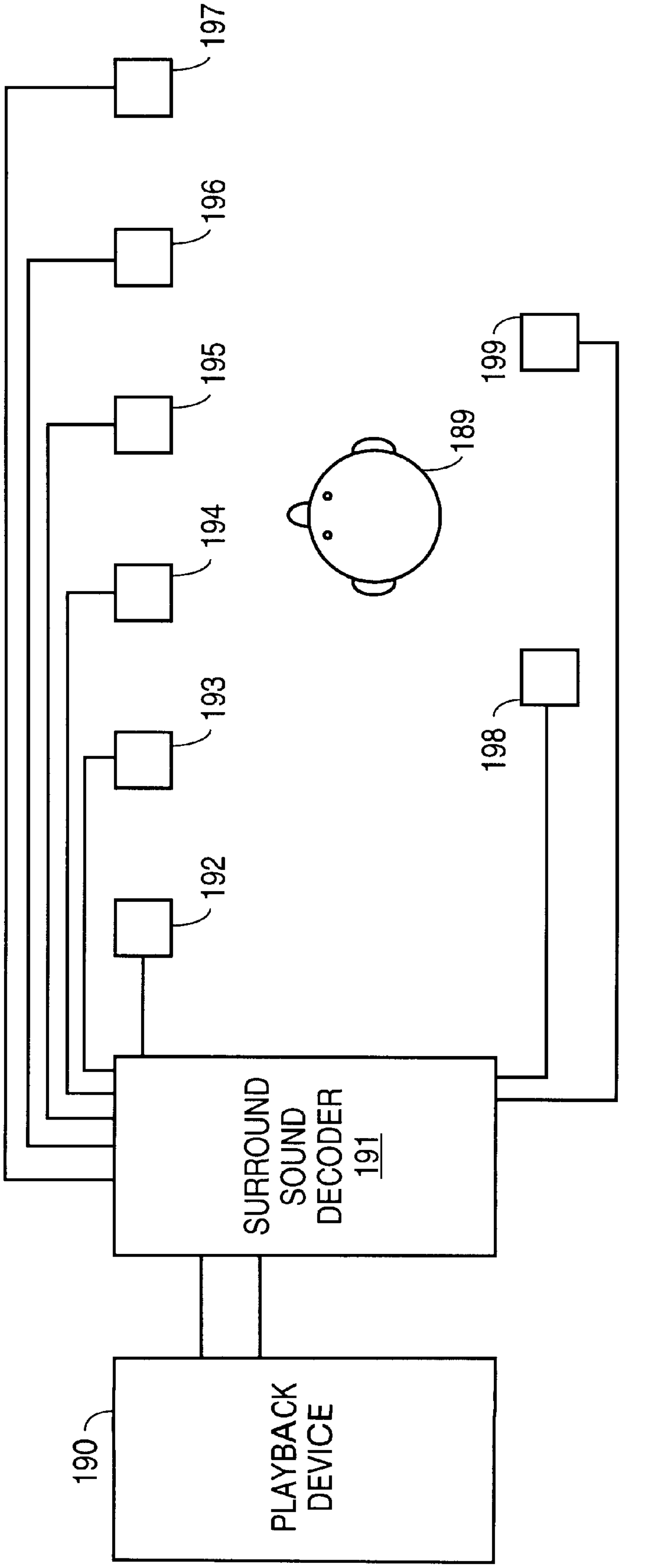
FIG. 1*d* is a block diagram illustrating the playback circuitry in accordance with the teachings of the present invention.

FIG. 1*d* is a simplified block diagram of a surround sound system that incorporates the teachings of the present invention. The playback device 190 reads the recording media to output two channels of audio. For example, if the recording media is film, a movie projector reads the audio tracks to extract the two channels of audio. The two channels are input to a surround sound decoder 191 which generates a surround sound output to the plurality of front speakers 192, 193, 194, 195, 196, subwoofer 197 and surround speakers, 198, 199 located to the rear of the listener 189. It is contemplated that commercially available surround sound decoders are used; however, a specially designed decoder that is capable of processing the input signals may also be used.

As will be described below, the two channels of audio encoded in accordance with the teachings of the present invention selectively place signals in a quadrature which allows a mix of front and rear signals to appear as separate signals at the output of the decoder. The surround sound decoder receives the two channels (LT, RT) and generates sum (LT+RT) and difference (LT−RT) signals. The input signals and sum and difference signals are input to a matrix decoder which continuously determines the strongest signal and adjusts the output gain levels of the output channels according to the matrix decoder values.

Figure 2:
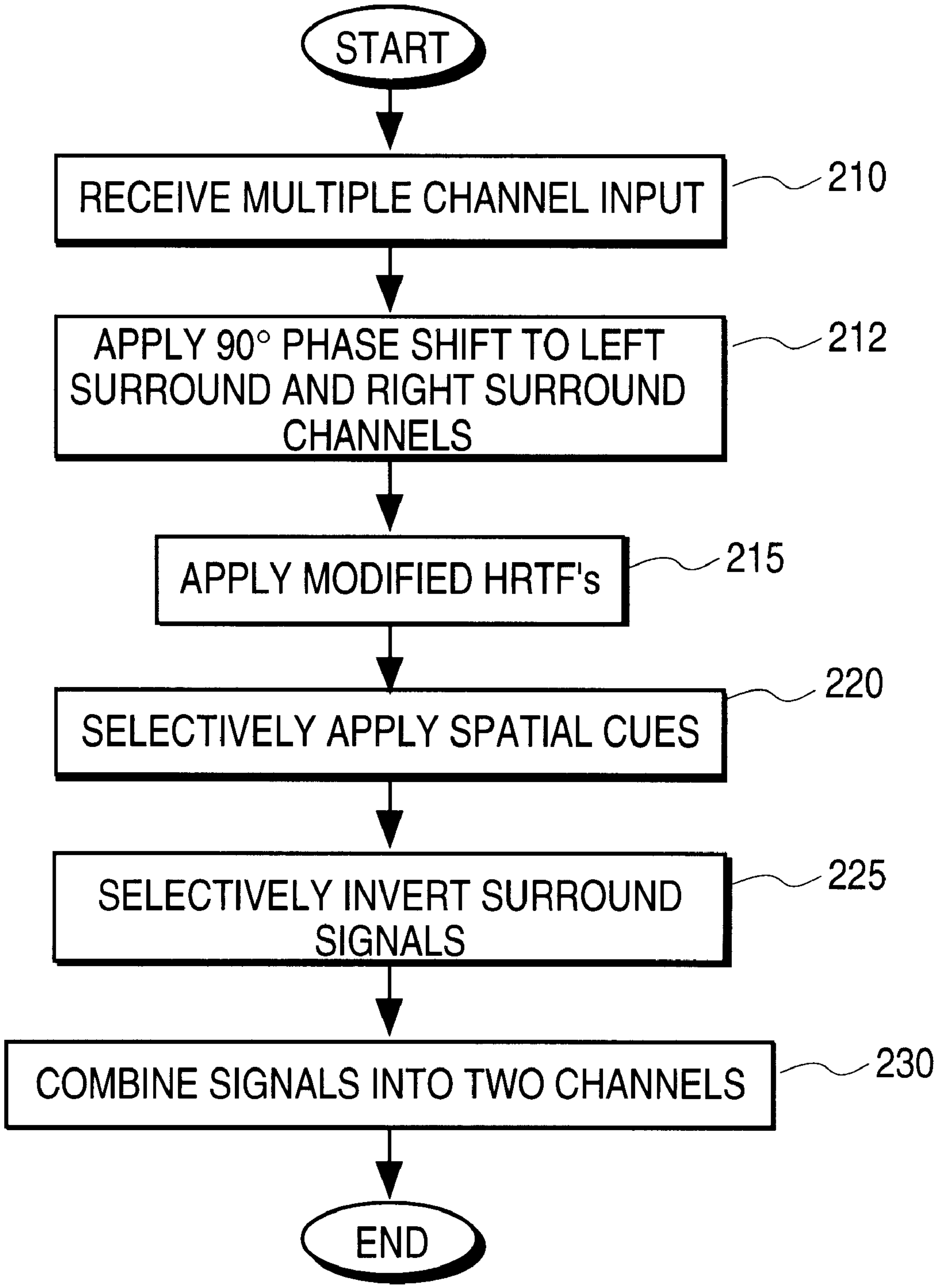
FIG. 2 is a simplified flow diagram of one embodiment of the process of the present invention.

The process for generating two channel output containing audible directional cues will generally be described with reference to FIG. 2. At step 210, the surround sound channels are received. For purposes of explanation, the terms surround sound channels and surround sound signals are used to represent multiple channels of sound that are intended to be played out of speakers at different locations relative to the listener. However, the present invention is not limited to a surround sound configuration, but can be applied to any multiple channel sound that makes use of audible directional cues.

At step 212 a 90° phase shift is applied to the rear channels (The rear channels are also referred to as the surround channels). This step is preferably performed when the two channel output is subsequent input to a surround sound decoder for playback. In addition to surround sound compatibility, the 90° phase shift enhances the perception that audio signals are originating behind the listener.

Head related transfer functions (HRTFs) were developed to correspond to spherical directions around the head of the listener. At step 215, HRTFs are applied to the input channels. The HRTFs are applied to sound signals to provide audible directional cues in the sound signals. Preferably, in one embodiment, the HRTFs are modified to factor out the frequency response of the HRTF corresponding to one of the front channels. Preferably, the HRTF for a front channel, such as the front center channel ($HRTF_c$), is factored out from the HRTFs for the surround channels (left and right channels): left surround, left channel output ($HRTF_{lsl}$), left surround, right channel output ($HRTF_{lsr}$), right surround, right channel output ($HRTF_{rsr}$), right surround, left channel output ($HRTF_{rsl}$). Alternately, the HRTF for a front channel is factored from all the channels e.g., left front, right channel output ($HRTF_{lr}$), left front, left channel output ($HRTF_{ll}$), left center, left channel output ($HRTF_{lcl}$), left center, right channel output ($HRTF_{lcr}$), right center, right channel input ($HRTF_{rcr}$), right center, left channel output ($HRTF_{rcl}$), right front, left channel output ($HRTF_{rl}$), right front, right channel output ($HRTF_{rr}$), center front, right channel output ($HRTF_{cr}$), center front, left channel output ($HRTF_{cl}$), left surround, right channel output ($HRTF_{lsr}$), left surround, left channel output ($HRTF_{lsl}$), right surround, left channel output ($HRTF_{rsl}$), right surround, right channel output ($HRTF_{rsr}$).

Preferably, the HRTF of the selected channel is removed from the HRTFs of the surround channels by subtracting the HRTF of the selected front channel from the HRTFs of the surround channels. By removing the HRTF of the selected front channel before applying the HRTFs to the corresponding signals, improved quality, high bandwidth audio signals are generated as the modified HRTF applied does not function to significantly modify the perceived bandwidth of the signal. In addition, the modified HRTF further delineates sounds originating from the front and rear resulting in 360 degree, high quality sounds. In implementation, the modified HRTFs can be computed a variety of ways. For example, the difference between the rear and the front HRTF values at each particular frequency (e.g. 1 KHz, 2 KHz, 3 KHz, etc.) specified are determined to compute the modified HRTF.

Other embodiments that remove the HRTF of the selected front signal can also be used. For example, in one embodiment, the selected front HRTF is removed from both surround channels. Preferably the HRTF for the center front channel is used. Alternately, the same selected front HRTF need not be applied to both surround HRTFs. For example, the HRTF for the front left or left center signal can be removed from the HRTF of the left surround signal and the HRTF of the right or right center signal can be removed from the HRTF of the right surround signal. In addition, the HRTF of a selected front channels(s) may be removed from the HRTFs for all the front signals and the surround signals and still achieve desirable results. Although the present invention is described as using modified HRTFs, it is contemplated that the invention is not limited as such.

At step 220, spatial cues are selectively applied. In most cases, excluding the use of stereo headphones, a sound from the left of the listener is heard in both in the left ear and right ear of the listener. Under similar listening conditions, a sound from the right of the listener can be heard in both the right ear and left ear of the listener. In most situations, sounds that are perceived to be coming from one side of the listener is also heard in the ear that is opposite to the side that it is perceived to be coming. While being a relatively rare event, this is not the case with a listener using stereo headphones. In the case if the listener using stereo headphones, a sound that is emitted exclusively from the left speaker of a stereo headphone, for practical purposes, is exclusively heard with the left ear. Conversely, in the case of the listener using stereo headphones, a sound that emitted exclusively from the right speaker of a stereo headphone, for practical purposes, is exclusively heard with the right ear. Since it is a relatively rare event for a person to be listening to sounds with stereo headphones, it can be perceived as unnatural or disturbing to the listener to be hearing sounds exclusively in one ear or the other. To counteract this negative perception, in the preferred embodiment, sounds that are to be perceived to be coming from one side of the listener are added to the channel that is to be heard with the opposite ear. Since doing so tends to diminish the listener's perception of a sound being emitted either from the left or right, further spatial cues are added to the signals in to distinguish sounds in the right to left directions as heard by the right ear for the left channel, and the left ear for the right channel.

These cues are typically applied to the signals representing sounds sources opposite to the output channel; e.g., applied to the left and left center signals to be output to the right channel, and right and right center signals output to the left channel. Preferably, spatial cues are provided via signal level modification. For example, a signal that has a point of origin to the left will be perceived as louder to the left ear than to the right ear. Thus the level of the left signal output through the right channel may be adjusted down relative to the level of the left signal output through the left channel, or the level of the left signal output through left channel may be adjusted up relative to the level of the left signal output through right channel.

The amount of level control is preferably empirically determined and may be varied according to end use, e.g. whether the two channel output is to be played through a surround sound decoder or simply output to drive a two speaker system. However, the amount of level adjustment added should be enough to provide the desired spatial cues, but not too much that the listener perceives either an echo in the signal, or that the signal indicates an origin too far away the center, or the signal indicates an origin too far towards the center. A balance of the left and right level controls for each signal can be set to achieve what might be considered an acceptable left to right placement of each sound image. Therefore, in one embodiment for subsequent output to a two speaker system, a difference in the level between the signal being sent to the channel on the side that it is heard and the signal being sent to the channel on the opposite side that it is to be heard is within the range of 0 dB to 90 dB of the signal on the same side.

In addition, compensation delays are selectively added to various audio signals such that the signals are output concurrently with the other signals. Compensation delays are desirable as the processing performed on some signals typically take a different amount of time to perform than the time to perform processing of other signals. The compensation delay for each signal should be set so that all signals are outputted at the appropriate time, regardless of incidental processing time.

At step 225, the copies of the surround signals are selectively inverted. The selected inversion process, in combination with the summing process subsequently performed to combine the signals that form each channel, result in the signals being subtracted from the combined signals. This, in addition to shifting the right surround signal and left surround signal 90 degrees in phase, provides surround sound capability for processing through surround sound decoders by placing the signals in quadrature which allows a mix of front and rear signals to appear as separate signals at the output of the decoder. In the present embodiment, the copies of the phase shifted surround signals to be combined to form one of the two output channels are inverted. For example copies of the left surround signal and right surround signal to be to be output to the right total (RT) channel are inverted prior to combination with corresponding front signals that form the RT signal. Alternately, the inversion process can be performed by subtracting the identified signals from the combined signals.

Once the signals are generated for the two output channels (RT and LT) the signals are combined to generate the two channels (RT and LT) that can subsequently be played through a two speaker system, such as stereo headsets, step 230.

Figure 3:
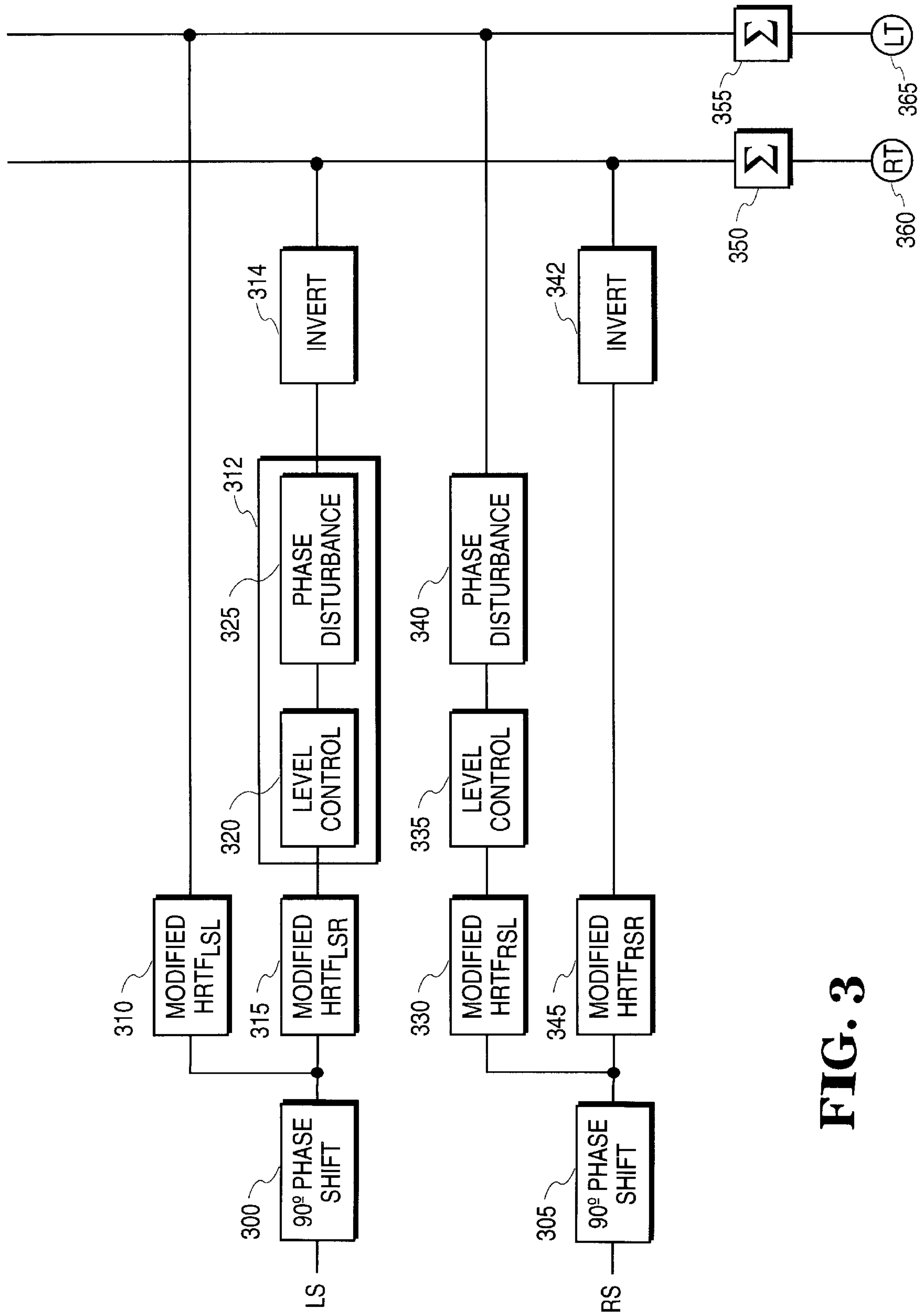
FIG. 3 is a block diagram representation of one embodiment of elements that process surround sound signals in accordance with the teachings of the present invention.

FIG. 3 is a simplified block diagram of one embodiment of the functional blocks through which the surround signals (LS and RS) are processed. As mentioned earlier, these functional blocks can be implemented through hardware, such as logic circuits, software which is executed by a processor or a combination of hardware and software.

Referring to FIG. 3, each surround signal is processed independently but with common processing steps to produce two output channels. Each surround signal (LS and RS) is first optionally phase shifted 90 degrees, block 300, 305. This circuit 300, 305 is preferably included when the output signals (LT 360 and RT 365) are input to a surround sound decoder. A variety of implementations can be used. For example, in one embodiment, a Hilbert transform is utilized to perform the phase shift, (see, e.g.) Oppenheim, A. and Schafer, R., *Discrete Time Signal Processing*, pp. 662–686, (Prentiss-Hall, 1989).

A copy of each signal is made and input to a first sequence of circuitry (e.g., 310) for subsequent output to the left total channel (LT 365) and to a second sequence of circuitry (e.g., 315, 312) for output to the right total channel (RT 360).

The first sequence of circuitry 310 processes the copy of the input signal (LS or RS) that is subsequently to be output to the same side (e.g., LT or RT, respectively). Thus, with respect to the left surround (LS) signal input, the copy subsequently output to the left total output (LT 365) is processed by modified HRTF, frequency response alteration circuit 310, for the left surround, left channel output (HRTFlsl). As described above, the HRTF is modified preferably by removing the HRTF of a selected front signal from the HRTF to be applied to the input signal. It has been determined that removal of a selected front HRTF component from the surround signals enhances the front/rear spatial cues to enable a listener to better distinguish between sounds originating from the front from those originating from the rear. This enhancement is achieved with little detrimental effect on the perceived bandwidth of the signals. Preferably the frequency response alteration circuit 310 is a 9 tap finite impulse response (FIR) filter.

In addition, the copies of the surround signals associated with one of the output channels (e.g., LT or RT) are inverted by circuits 314, 342 prior to combination with the other signals. The resultant effect is to subtract these signals from the combined signals.

The output of circuit 310 is input to combination circuitry 355 for the left total (LT) channel 365. Combination circuitry 355 combines all the signals, front and surround, to be output through the left channel 365. Combination circuitry 350 similarly functions to generate the combined signal to be output as the right channel 360.

The second sequence of circuitry 315, 312 processes the copy of the input signal that is to be output subsequently to the opposite side. Thus, with respect to the left surround signal input, the copy subsequently output to the RT output 360 is processed by modified HRTF circuit 315, and spatial cue circuit 312 which includes level control circuit 320 and phase disturbance circuit 325. The modified HRTF circuit 315 applies to the input signal a modified HRTF that corresponds to the difference between the HRTF of a selected front signal and the HRTF for the left surround signal, right side.

Level control circuit 320 processes the signal output from circuit 315 to adjust the left/right directional cues. As the original signal input is one intended to be output to a speaker located to the left of the listener in a surround sound setting, the listener would incur a delay in detecting the sounds in the right ear. Therefore level circuitry 320 compensates for these differences.

Phase disturbance circuit 325 enhances the directional cues that distinguish between sounds originating from the front and the rear. In one embodiment, the phase disturbance circuit 325 adds delays to the signal output from circuit 320.

Similar circuitry is used to process the right surround signal. A 90 degree phase shift is applied to the right surround signal input by circuit 305. The signal is then processed through a first sequence of circuitry 345, 342 and second sequence of circuitry 330, 335 and 340 for input to combination circuitry 350 and 355, respectively.

Figure 4:
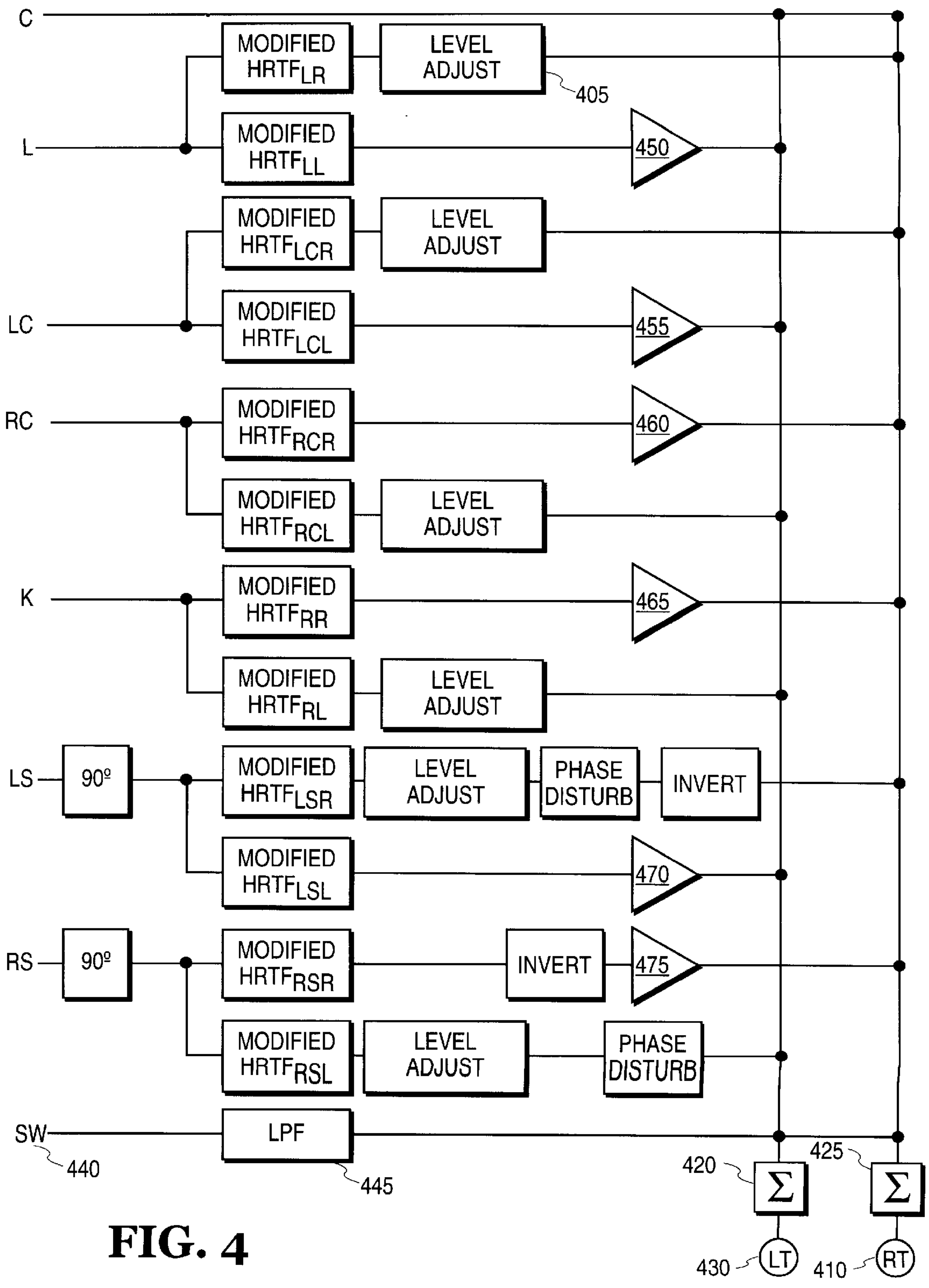
FIG. 4 is a block diagram representation of one embodiment of a system for converting a multiplicity of signals to two channels in accordance with the teachings of the present invention.
Figure 5:
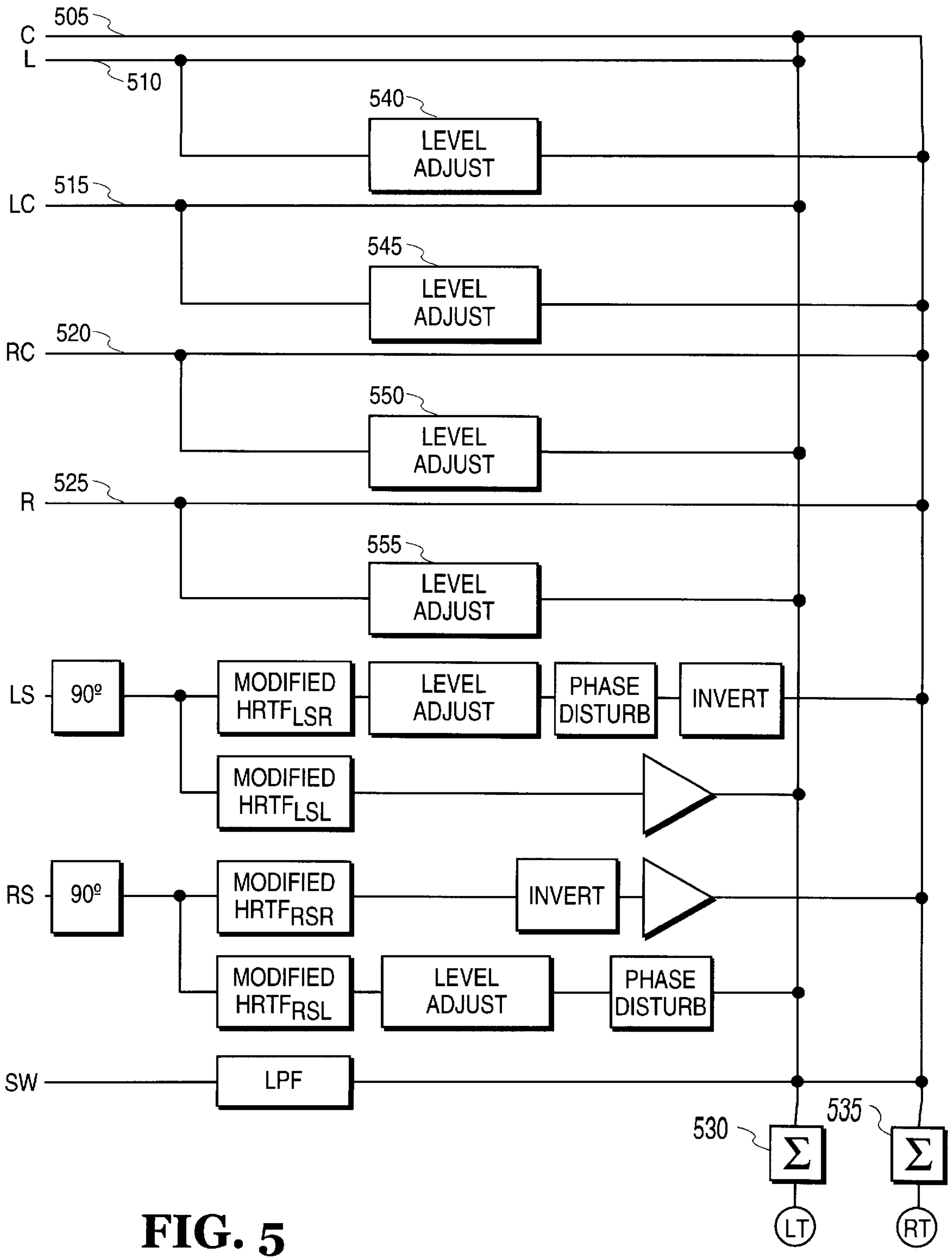
FIG. 5 is a block diagram representation of another embodiment of a system for converting a multiplicity of signals to two channels in accordance with the teachings of the present invention.

The modified left surround and right surround signals may be combined with front signals that are modified or unmodified. These embodiments are illustrated in FIGS. 4 and 5. In particular, FIG. 4 illustrates one embodiment in which modified HRTFs are applied to the front signals. The modified HRTFs are generated by subtracting the HRTF of the selected front signal from the HRTF corresponding to the input channel. In addition, level control time delay adjustment circuits process the signal directed to the output channel opposite to the side of the input channel. For example, circuit 405 is applied to the left signal that is output to the right total (RT) channel 410. In addition, compensation delays, e.g., 450, 455, 460, 465, 470, 475, are added where needed to maintain proper timing relationships among signals.

The left surround (LS) and right surround (RS) inputs are processed in a manner similarly to that described with respect to FIG. 3. The subwoofer signal 440 may be processed through a modified HRTF; alternately, as is illustrated in FIG. 4, the subwoofer signal may be processed through a low pass filter 445, preferably with a cutoff frequency set at 250 KHz, for input to the LT and RT channels. The modified front and rear (surround) signals are output to combination circuits 420, 425 and are combined into two channels, LT 430 and RT 410.

FIG. 5 illustrates an alternative embodiment in which a level adjustment and/or time delay is selectively applied to the front signals, 505, 510, 515, 520, 525 and output the combination circuits 530, 535. The delay level adjustment circuits 540, 545, 550, 555 adjust the levels to the signals to provide left/right directional cues. Preferably, compensation delays (not shown) are added such that the proper timing between signals is maintained. The rear signals 540, 545 are modified in accordance with the teachings of the present invention to provide spatial cues necessary for a listener to audibly distinguish the locations of sound sources.

Figure 6:
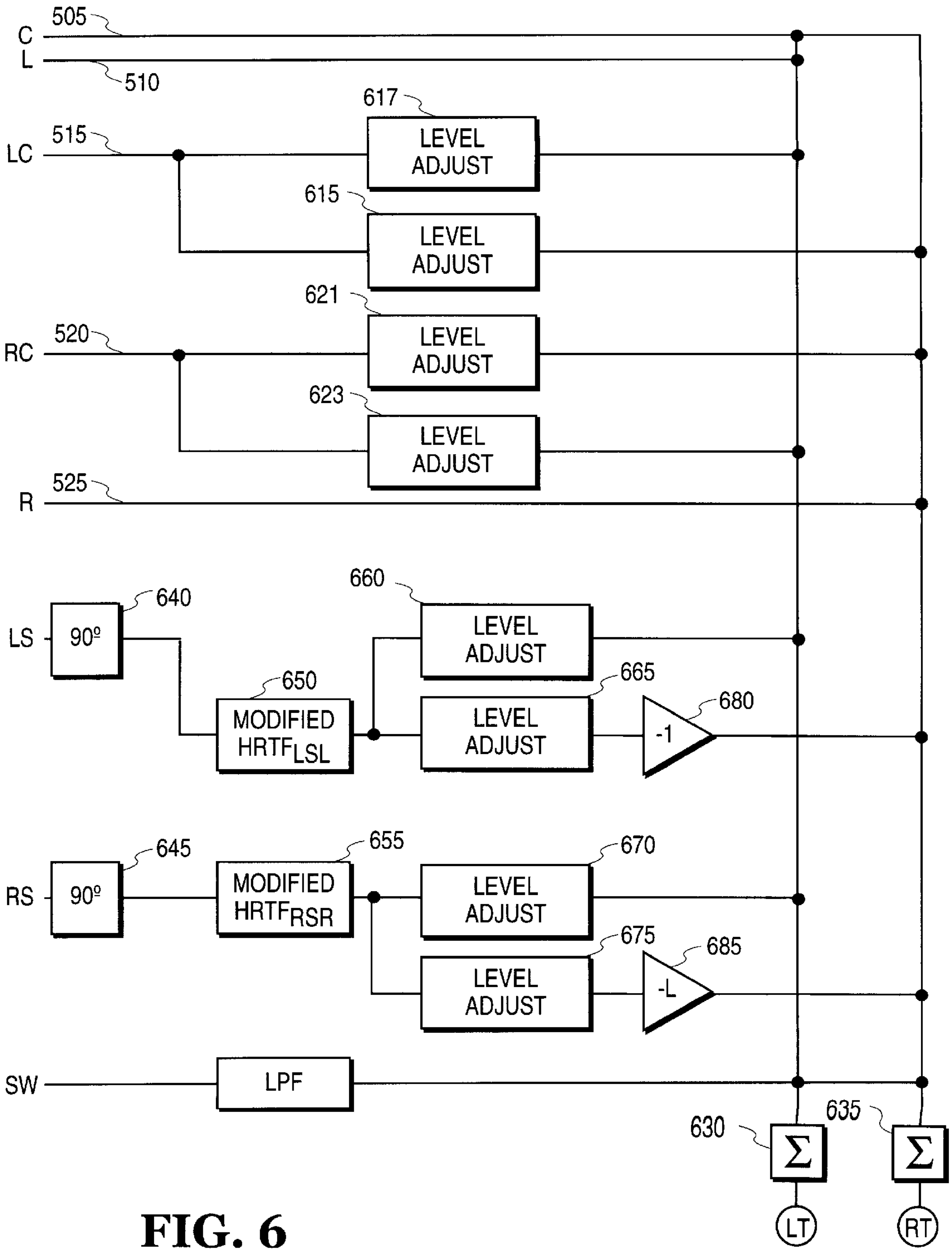
FIG. 6 is a block diagram of another embodiment of a system for processing a multiplicity of signals to two channels for subsequent input to a surround sound decoder.

FIG. 6 is a illustrates one embodiment effective for processing signals for subsequent output to a surround sound decoder. In this embodiment, the left 610 and right 625 channels are simply output unchanged to the corresponding (i.e., LT 630, RT 635) channel; similarly the center channel 605 is output unchanged to the LT 630 and RT 635 channels. However, it is contemplated that other signal processing, for example, that discussed earlier, can be performed on the L 610, R 625, and C 605 signals. Similarly, the remaining signals that will be discussed can also include additional signal processing not illustrated in the present embodiment.

The LC and RC signals are adjusted by blocks 617, 619, 621, 623 and output to the LT 630 and RT 635 channels. A 90 degree phase shift and modified HRTFs are applied to the RS and LS surround channels, blocks 645, 640, 655, 650.

Level adjusts are performed, blocks 660, 665, 670, 675. The LS signal and RS signal to be output to the RT channel 635 are inverted by inverters 680, 685.

The invention has been described in conjunction with the preferred embodiment. It is evident that numerous alternatives, modifications, variations and uses will be apparent to those skilled in the art in light of the foregoing description.

What is claimed is:

1. A method for generating two channels of sound signals from a multiplicity of sound signals, said multiplicity of sound signals comprising a first plurality of front signals and second plurality of rear signals, said method comprising the steps of:

applying a 90° phase shift to the second plurality of rear sound signals;

applying head related transfer functions to the phase shifted second plurality of rear sound signals to generate modified rear sound signals, said modified rear signals comprising signals identified as corresponding to the first channel and signals corresponding to the second channel;

said front signals comprising signals identified as corresponding to the first channel and signals corresponding to the second channel;

combining the signals corresponding to the first channel to generate a first combined signal, the modified rear signals corresponding to the first channel being subtracted from the remaining signals corresponding to the first channel;

combining the signals corresponding to the second channel to generate a second combined signal; and recording the first combined signal and second combined signal on a first audio track and second audio track of a film respectively.

2. A method for generating two channels of sound signals from a multiplicity of sound signals, said multiplicity of sound signals comprising a first plurality of front signals and second plurality of rear signals, said method comprising the steps of:

applying a 90° phase shift to the second plurality of rear sound signals;

applying head related transfer functions to the phase shifted second plurality of rear sound signals to generate modified rear sound signals, said modified rear signals comprising signals identified as corresponding to the first channel and signals corresponding to the second channel;

said front signals comprising signals identified as corresponding to the first channel and signals corresponding to the second channel;

combining the signals corresponding to the first channel to generate a first combined signal, the modified rear signals corresponding to the first channel being subtracted from the remaining signals corresponding to the first channel;

combining the signals corresponding to the second channel to generate a second combined signal; and recording the first combined signal and second combined signal.

3. A method for generating two channels of sound signals from a multiplicity of sound signals, said multiplicity of sound signals comprising a first plurality of front signals and second plurality of rear signal, said method comprising the steps of:

applying a 90 degree phase shift to the second plurality of rear sound signals to generate phase shifted rear sound signals;

applying head related transfer functions to the phase shifted rear sound signals to generate modified rear sound signals, said modified rear signals comprising signals identified as corresponding to the first channel and signals corresponding to the second channel;

selectively inverting modified rear signals such the modified rear signals corresponding to the first channel are inverted;

said front signals comprising signals identified as corresponding to the first channel and signals corresponding to the second channel;

combining the signals corresponding to the first channel to generate a first combined signal;

combining the signals corresponding to the second channel to generate a second combined signal; and further comprising the step of applying additional spatial cues to the selected ones of the first plurality of front sound signals to generate spatial cued selected front signals, said spatial cued selected front signals comprising signals identified as corresponding to a first channel and signals corresponding to a second channel and respectively recording the first combined signal and second combined signal on a first audio track and second audio track of a film media.

4. An apparatus for generating two channels of sound signals from a multiplicity of sound signals, said multiplicity of sound signals comprising a first plurality of front signals and second plurality of rear signals, said apparatus comprising of:

a plurality of inputs for receiving a plurality of sound signals;

a processing device for receiving a plurality of sound signals, said processing device, applying a 90° phase shift to the second plurality of rear sound signals, applying head related transfer functions to the second phase shifted plurality of rear sound signals to generate modified rear sound signals, said front signals comprising signals identified as corresponding to a first channel and signals corresponding to the second channel, said modified rear sound signals comprising signals identified as corresponding to a first channel and signals corresponding to a second channel, combining the signals corresponding to the first channel to generate a first combined signal, the modified rear signals being subtracted form the remaining signals corresponding to the first channel, combining the signals corresponding to the second channel to generate a second combined signal, and recording the first combined signal and second combined signal on a first audio track and second audio track of a film media.

5. An apparatus for generating two channels of sound signals from a multiplicity of sound signals, said multiplicity of sound signals comprising a first plurality of front signals and second plurality of rear signals, said apparatus comprising of:

a plurality of inputs for receiving a plurality of sound signals;

a processing device for receiving a plurality of sound signals, said processing device, applying a 90° phase shift to the second plurality of rear sound signals, applying head related transfer functions to the second phase shifted plurality of rear sound signals to generate modified rear sound signals, said front signals comprising signals identified as corresponding to a first channel and signals corresponding to the second channel, said modified rear sound signals comprising signals identified as corresponding to a first channel and signals corresponding to a second channel, combining the signals corresponding to the first channel to generate a first combined signal, the modified rear signals being subtracted form the remaining signals corresponding to the first channel, combining the signals corresponding to the second channel to generate a second combined signal, and causing recording the first combined signal and second combined signal.

6. A method for generating surround sound signals comprising the steps of:

accessing a first channel and second channel of encoded sound signals stored on media, said sound signals encoded by processing a first plurality of front signals and second plurality or rear signals by applying a 90 degree phase shift to the second plurality of rear sound signals, applying head related transfer functions to the phase shifted second plurality of rear sound signals to generate modified rear sound signals, said modified rear signals comprising signals identified as corresponding to the first channel and signals corresponding to the second channel, said front signals comprising signals corresponding to the first channel and signals corresponding to the second channel, combining the signals corresponding to the first channel to generate a first combined signal that is stored as the first channel on the media, wherein the modified rear signals are subtracted from the remaining signals corresponding to the first channel, and combining the signals corresponding to the second channel to generate a second combined signal that is stored as the second channel on the media;

inputting the first channel of encoded sound signals retrieved to a first channel input to a surround sound decoder;

inputting the second channel of encoded sound signals retrieved to a second channel input to the surround sound decoder;

said surround sound decoder decoding the encoded sound signals input and generating a multiplicity of surround sound signals.

7. The method as set forth in claim 6, wherein the head related transfer functions used are modified head related transfer function each of which is the difference between a selected front head related transfer function and a rear head related transfer function that corresponds to the rear sound signal the modified head related transfer function is applied to.

8. The method as set forth in claim 6, wherein the media is film.

9. The method as set forth in claim 6, wherein the media is film and the step of accessing comprises playing the film through a film projector system.

10. A machine readable medium containing two channels of signals which, when executed by a surround sound system, causes the system to generate enhanced surround sound, said signals generated by processing a first plurality of front signals and second plurality of rear signals by applying a 90 degree phase shift to the second plurality of rear sound signals, applying head related transfer functions to the phase shifted second plurality of rear sound signals to generate modified rear sound signals, said modified rear signals comprising signals identified as corresponding to the first channel and signals corresponding to the second channel, said front signals comprising signals corresponding to the first channel and signals corresponding to the second channel, combining the signals corresponding to the first channel to generate a first combined signal that is stored as the first channel on the media, wherein the modified rear signals corresponding to the first channel are subtracted from the remaining signals corresponding to the first channel, and combining the signals corresponding to the second channel to generate a second combined signal that is stored as the second channel on the media.

* * * * *